US007559075B2

(12) United States Patent
Takagi et al.

(10) Patent No.: US 7,559,075 B2
(45) Date of Patent: Jul. 7, 2009

(54) DIGITAL TELEVISION BROADCAST SIGNAL RECEIVER

(75) Inventors: Toshihiro Takagi, Daito (JP); Tatsuo Miyagawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 617 days.

(21) Appl. No.: 11/184,862

(22) Filed: Jul. 20, 2005

(65) Prior Publication Data

US 2006/0020988 A1 Jan. 26, 2006

(30) Foreign Application Priority Data

Jul. 20, 2004 (JP) ............................ 2004-212177

(51) Int. Cl.
*H04N 7/20* (2006.01)

(52) U.S. Cl. ......................... 725/72; 725/100; 725/131; 725/151; 343/735; 348/570

(58) Field of Classification Search .................. 725/72, 725/100, 131, 139
See application file for complete search history.

(56) References Cited

U.S. PATENT DOCUMENTS

2007/0044125 A1* 2/2007 Lee ............................ 725/72

FOREIGN PATENT DOCUMENTS

JP 06-334931 A 12/1994
JP 08-242144 A 9/1996

* cited by examiner

*Primary Examiner*—Vivek Srivastava
*Assistant Examiner*—Fred Peng
(74) *Attorney, Agent, or Firm*—Crowell & Moring LLP

(57) ABSTRACT

In multi-directional antennas connected to a digital TV broadcast signal receiver, when a receiving channel is selected, if an antenna is set to the same direction as a previously stored direction, and signals cannot be received, the previously stored direction data is deleted, and if the best receiving direction is searched by the auto-scan, and a receivable direction does not match the previously stored receiving direction, the stored direction information is all deleted, the entire area scan is performed over all directions for all channels, and a new receiving direction for each channel is determined by the obtained best receiving direction. By doing this, when signals becomes unreceivable on a given channel while receiving them with a direction-adjusted smart antenna, meaningless time for adjusting directions is saved and the best reception condition is always obtained quickly by detecting the direction misalignment as soon as possible and updating the direction data on all other channels as well in the early stages.

1 Claim, 7 Drawing Sheets

FIG. 6

Receiving direction table

40

| Channel number 41 | ADD flag 42 | Best receiving direction 43 |
| --- | --- | --- |
| 1 | | D01 |
| 2 | O | D01 |
| 3 | | D15 |
| ~ | | |
| P | | $D_M$ |
| 128 | O | D16 |
| 129 | | D02 |

DIGITAL TELEVISION BROADCAST SIGNAL RECEIVER

BACKGROUND OF THE INVENTION

1. Field of the Invention

The present invention relates to a digital television broadcast signal receiver to receive digital television broadcast signals, such as ATSC (Advanced Television Systems Committee).

2. Description of the Related Art

Since, in North America where the ATSC digital television broadcast (TV broadcast) is provided, large cities are located in plain fields, and TV broadcast signals come from various directions from the viewpoint of users who receive TV broadcast signals sent from around each city, users need to adjust the direction of antennas towards the broadcast station which broadcasts programs they wish to watch. Therefore, a multi-directional antenna is coming into practical use. A general antenna for ground wave television broadcasts has a shape called a Yagi antenna and is characterized by the ability to receive even weak radio waves because of strong directional characteristics. On the other hand, it also has a disadvantage in that it can receive only radio waves from a given broadcast station because of these strong directional characteristics. At the same time, the strength of receiving signals varies even with slight direction changes because of these characteristics.

Also, for devices to control the directional characteristics of antennas, the following method (see Japanese Unexamined Patent Application Publication H06-334931) is known: adjusting the directional characteristics of antennas by phase combinations through shifting with a switch by using different received radio wave phases of two types of antennas; in addition, for devices relating to the automatic synchronization reception, the following auto-preset method (see Japanese Unexamined Patent Application Publication H08-242144) is known: automatically storing receiving frequency information into a memory by supplying power when an antenna is connected to a tuner.

As described above, since there is a possibility of broadcast radio waves coming from all directions in the ATSC digital television broadcast in the US, a multi-directional antenna (smart antenna) is required to receive TV broadcasts, and, in the ETA-909 specification, a smart antenna is specified to have receiving directions in each of 16 directions into which a circle is divided. Meanwhile, as a digital television broadcast signal receiver that receives TV broadcast signals, it is set to be adjustable for the receiving direction of a multi-directional antenna for all 16 directions in order to comply with the EIA-909 specification.

In addition, there are some digital television broadcast signal receivers (digital TV broadcast signal receiver) that are equipped with an auto-scan function to select the antenna direction that can best receive TV broadcast signals of channels selected by a user. The receiving direction can be set by scanning all 16 directions for each channel and selecting the direction with the best reception conditions for it because the locations of broadcast station's antennas, which are broadcast towers, usually do not change. However, in countries like the U.S., broadcast stations, which are relatively easily to start as a new business, often go bankrupt. Therefore, a channel that could not be received before may become newly receivable, or one that could be received before may become unreceivable. Moreover, the reception condition of TV broadcast signals may vary due to the construction of tall buildings. Consequently, resetting may be needed as required for the best receiving direction of channels selected by a user. Even in the case in which a multi-directional antenna that requires less time to switch the receiving direction is connected to a digital TV broadcast signal receiver equipped with the auto-scan function, since the interval to output control signals for switching the receiving direction is long, the time required to determine the best receiving direction of the TV broadcast signals of a selected channel becomes very long, which irritates users.

On the other hand, in the initial direction setting of a smart antenna, some time is spent to measure the best receiving direction and the maximum signal receiving level for all local channels and for all directions in advance, they are stored in a TV receiver built-in memory, and the direction of the antenna is set to be able to be adjusted to a desired channel quickly based on the stored data when accessing for channel selection. However, since, in the case of using an in door antenna, there is a possibility that a user might change the installation location of an antenna or accidentally change the direction of an installed antenna physically, trouble such as TV signals becoming unreceivable can easily occur. In this case, once the direction of the antenna changes, the direction data stored in the TV receiver is thrown out, and the receiving direction data for each channel stored in the memory becomes irrelevant.

Therefore, in order to return to normal reception, the antenna search must be started again from the beginning to repeat the receiving level measurement for all channels and for all directions. For this, it is first necessary to detect the antenna movement as soon as possible and adjust the direction. When signals cannot be received on Channel X, there is a problem: even though the directions of antennas are not actually misaligned, some time is wasted on meaningless operations, such as unnecessary scanning of all channels, if there is no response to determine whether only Channel X becomes unreceivable for some reason or whether there is a misalignment of all antenna directions.

In addition, when the antenna direction is reset, there is a problem: since the stored direction information includes receiving direction information, receiving signal strength information, and additional information (such as the ADD flag, showing that the receiving signal strength is higher than the standard level), and the direction of an antenna is controlled according to the stored information, the correct antenna direction control is interfered with, as in a disruption of antenna direction adjustment in which the correct direction cannot be set, if old direction information is left without being updated.

SUMMARY OF THE INVENTION

An object of the present invention is to provide a digital TV signal receiver that can quickly start the readjustment of antenna directions for all channels because it can automatically detect the misalignment of antennas and obtain the latest direction information quickly and accurately, and that enables the acquisition of the best reception condition at all times by removing unnecessary antenna searches and saving meaningless scan time.

According to a feature of the present invention, a digital television broadcast signal receiver in which a multi-directional antenna having multiple receiving directions, is connected, and television broadcast signals are received by enabling a receiving direction in the receiving directions, comprises a control signal output unit for outputting control signals to specify a receiving direction for receiving television broadcast signal to the multi-directional antenna; a tuner to which the multi-directional antenna is connected, and television broadcast signals are received; a broadcast signal processing unit for performing signal processes for television broadcast signals received by the tuner; a memory for temporarily storing signals processed by the broadcast signal process unit; and a receiving direction determining unit for determining the best receiving direction for each receivable channel by using signals stored in the memory; wherein the broadcast signal processing unit calculates, in advance, the best receiving direction information that is the maximum receiving signal strength for each channel and the best receiving signal strength information in its direction by the scan action of the multi-directional antenna by control signals from the control signal output unit and storing them into the memory; and when the best reception cannot be obtained in the direction setting based on the best receiving direction information stored in the memory while the broadcast signal process unit is receiving a television broadcast, the receiving direction determining unit deletes the best receiving direction information for receiving channels stored in the memory in advance, scans the multi-directional antenna to search for the best receiving direction over all directions where are multiple directions for receiving channel, stores obtained new best receiving direction information in the memory, and determines a receiving direction of the multi-directional antenna for the receiving channel.

By such a configuration, the best receiving direction of antennas can be readjusted quickly and accurately, and the best reception condition can always be obtained because, when the antenna direction is readjusted, the influence of stored direction data can be completely removed, the scan procedure can also be performed smoothly, and the receiving direction data newly obtained after scanning can accurately be stored. In addition, the update of the stored data in the memory can be reliably performed, and then the amount of memory can be reduced. Therefore, meaningless time and effort will not be spent on the readjustment of the antenna directions, and proper reception can be provided quickly.

BRIEF DESCRIPTION OF THE DRAWINGS

FIG. 6 is a diagram showing a receiving direction table created by the entire area scan process of the above receiver.

DESCRIPTION OF THE PREFERRED EMBODIMENTS

Figure 1:
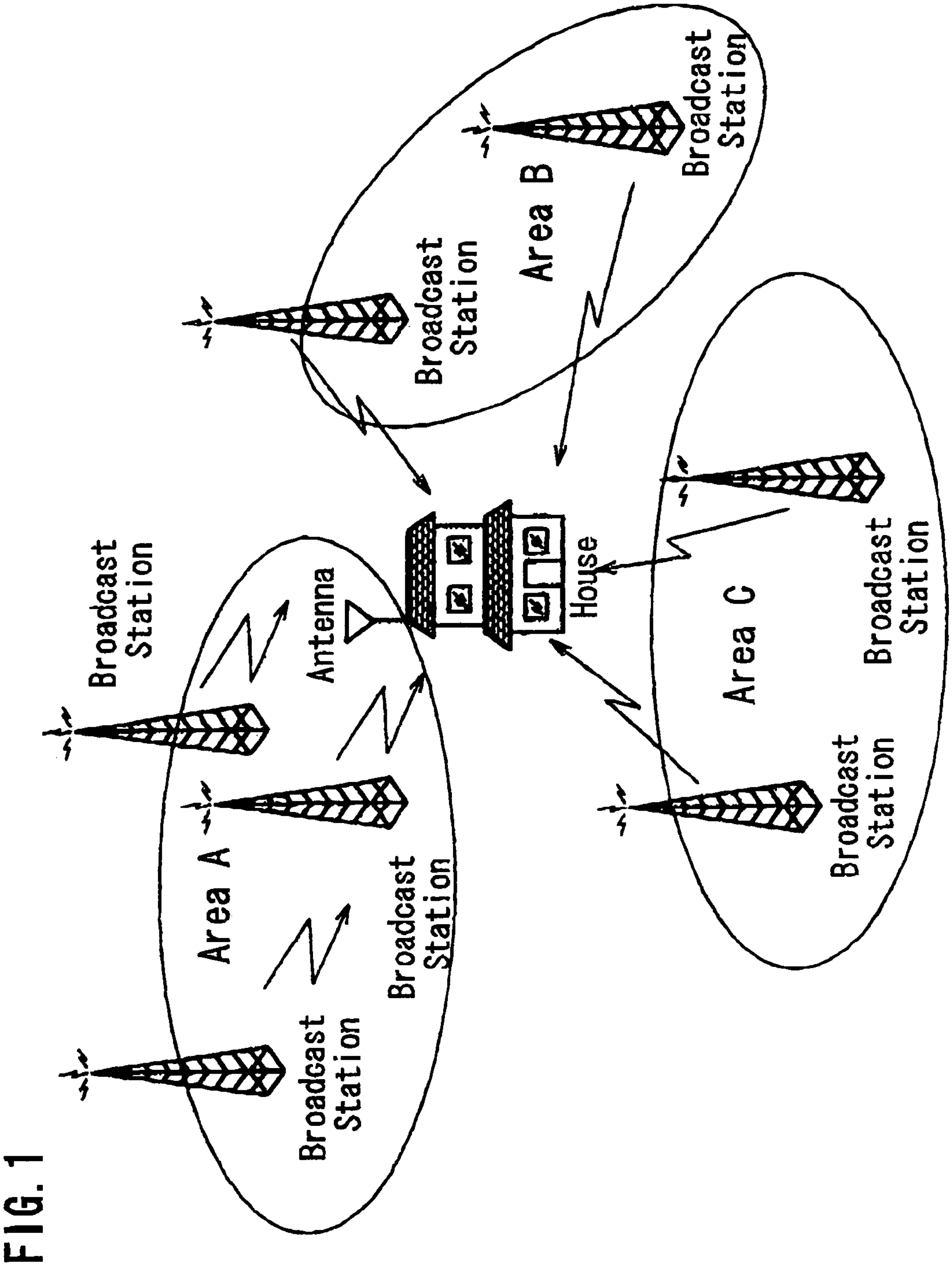
FIG. 1 is a conceptual diagram showing a state in which a user receives digital TV broadcast signals at home.

A digital TV broadcast signal receiver relating to an embodiment of the present invention is explained with reference to the figures. FIG. 1 shows a state in which a user receives TV broadcast signals at home. In areas where the digital (ground wave) TV broadcast is provided, if the strength of received digital TV broadcast signals is over a certain threshold, a certain quality of images can be obtained by correction, etc. Therefore, as shown in FIG. 1, TV programs can he watched by receiving the TV broadcast signals which are sent from broadcast stations that exist in multiple locations, such as area A, area B, and area C. Supporting these situations, a multi-directional antenna called a smart antenna, which has multiple receiving directions, comes into practical use.

The digital TV broadcast signal receiver can also receive analog TV broadcast signals and, as well as the digital TV broadcast signals, perform the lean and best receiving direction control while confirming the number of receiving directions of a multi-directional antenna. Therefore, when the digital TV broadcast signals and analog TV broadcast signals are not especially required to be recognized, signals will simply be referred to as TV broadcast signals.

On the other hand, a digital TV broadcast signal receiver that complies with the EIA-909 specification must be able to switch directions to all 16 receiving directions regardless of the type of connected multi-directional antenna or the-number of receiving directions.

When a multi-directional antenna is connected, the digital broadcast signal receiver relating to this embodiment receives TV broadcast signals for each of 16 receiving directions defined in the specification and measures the reception condition. The direction of the maximum receiving strength for signals of each receiving channel is stored, and a multi-directional antenna is pointed in the best direction as soon as a channel is selected.

Figure 2:
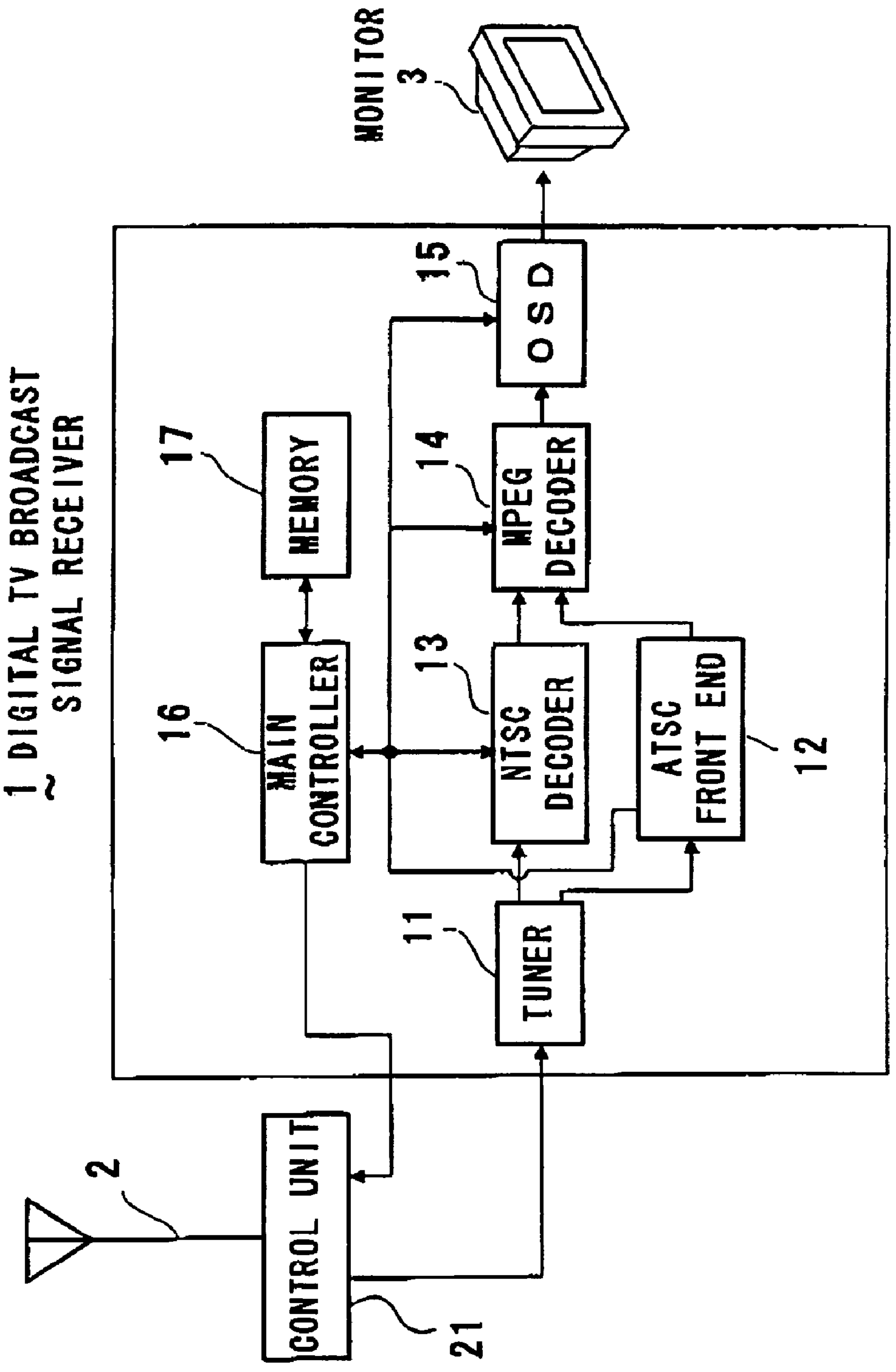
FIG. 2 is an electrical block diagram showing the structure of a digital TV broadcast signal receiver relating to an embodiment of the present invention.

FIG. 2 shows a configuration of a digital TV broadcast signal receiver 1 relating to this embodiment. The digital TV broadcast signal receiver 1 is comprised of a tuner 11, which is connected to a multi-directional antenna 2 and receives TV broadcast signals, a ATSC front end (digital broadcast signal process unit) 12, which performs certain signal processes for digital TV broadcast signals received by the tuner 11 and decodes them, an NTSC decoder (analog signal process unit) 13, which decodes analog TV broadcast signals received by the tuner 11, an MPEG decoder (signal output unit) 14, which decodes TV broadcast signals compressed with MPEG, an on-screen display part (OSD) 15, which overlaps certain display images on decoded TV broadcast signals, a main controller (CPU) 16, which controls the ATSC front end 12 and NTSC decoder 13 as well as detects the reception condition of TV broadcast signals received by the tuner 11 and controls a control unit 21 of the multi-directional antenna 2 (functions as a receiving direction determination unit and a control signal output unit), and a memory 17, which stores decoded TV broadcast signals temporarily and stores display images overlapped on decoded TV broadcast signals. TV broadcast signals decoded by the MPEG decoder 14 are output to a monitor 3 through the on-screen display part 15 and displayed. In addition, digital TV broadcast enables data transmission from the digital TV broadcast signal receiver 1 on the user's side to a broadcast station, but it does not have a direct relation with the present invention, so the explanation will be omitted.

The control unit 21 of the multi-directional antenna 2 starts according to control signals from the main controller 16 and enables only a designated direction in multiple receiving directions of the multi-directional antenna 2 after a multi-directional antenna is detected. When the multi-directional antenna 2 is a type that switches the receiving direction by swinging an antenna with a motor, the control unit 21 controls the turn of the motor to point the antenna in the designated direction. On the other hand, when the multi-directional antenna 2 is a type that switches the available antenna directions by turning on/off electronic switches, only an electronic switch connected to the antenna in a designated direction is turned on, and other electronic switches are turned off.

Figure 3:
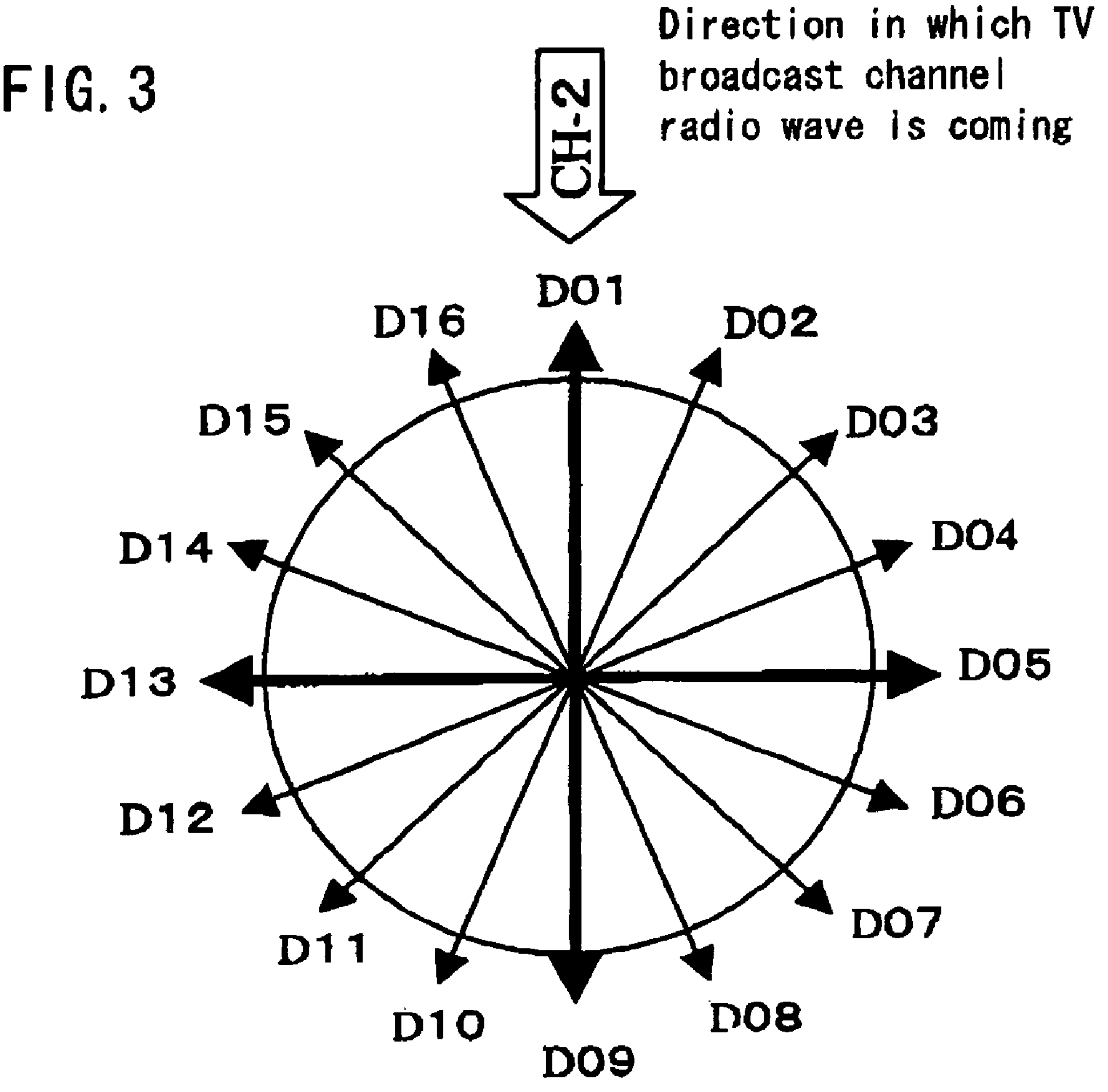
FIG. 3 is a diagram showing an example of antenna directions and the reception condition of the TV broadcast signals.

FIG. 3 shows an example of reception conditions in different directions of an antenna for TV broadcast signals in the case in which the multi-directional antenna 2 (smart antenna) has 16 receiving directions defined in the EIA-909 specification. In the figure, symbols D01 through D16 indicate the 16 receiving directions defined in the EIA-909 specification. Radio wave arrival directions for each channel of TV broadcast are indicated, for example, by CH-2 (CH is an abbreviation for channel) in bold arrows.

Figure 4:
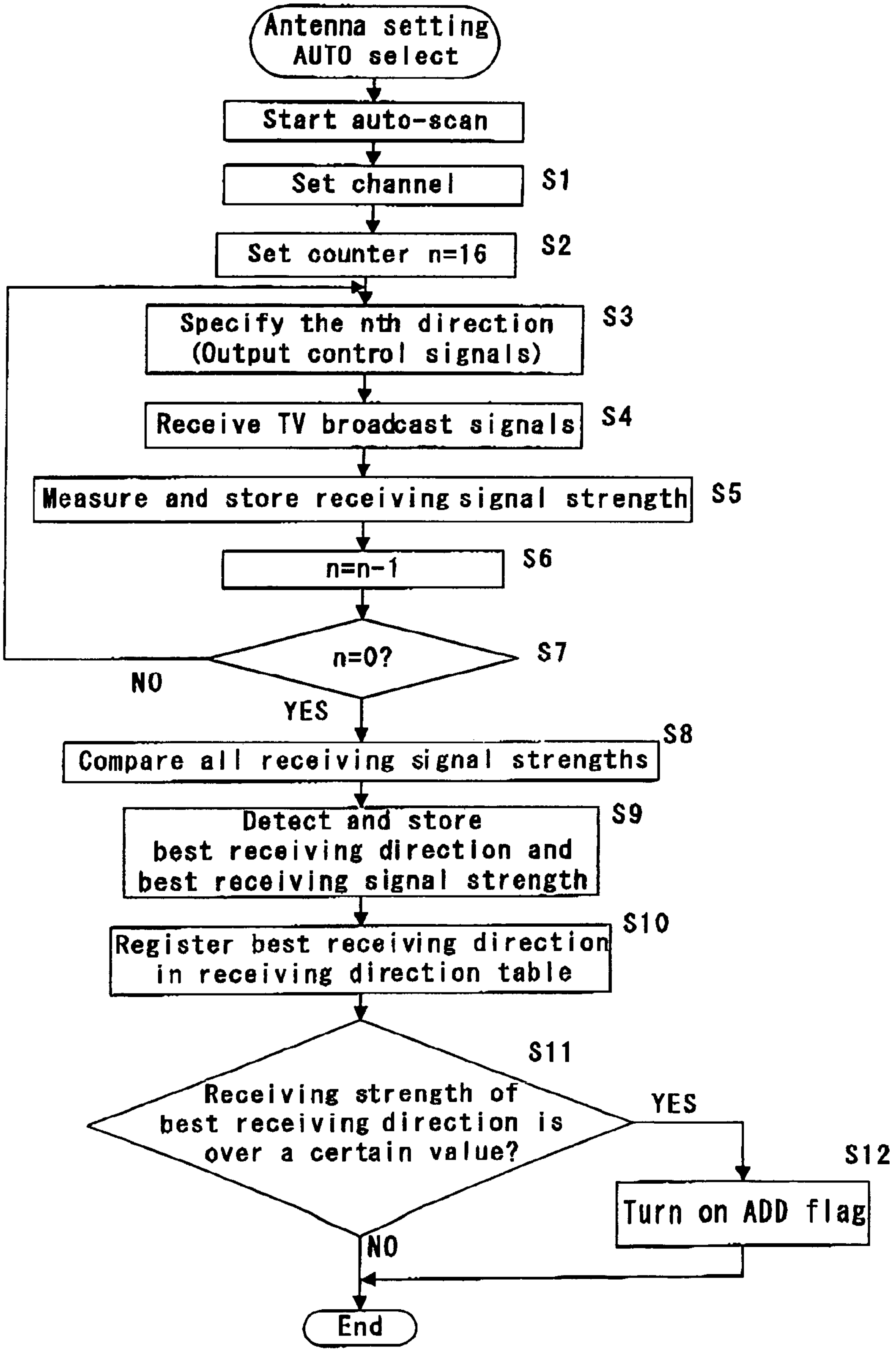
FIG. 4 is a flowchart showing the auto-scan process of the above receiver.

Next, for the auto-scan process of the digital TV broadcast signal receiver 1 in the case in which the best receiving direction is determined for an arbitrary channel distributed from a broadcast station, an explanation is provided with reference to the flowchart shown in FIG. 4. First of all, when the auto-scan mode is selected by a user to start the auto-scan, and a channel to determine the best receiving direction is set (S1), the main controller 16 sets N=16 to the counter (S2) and outputs control signals that designate the Nth direction (S3). After the control signals are output to the control unit 21 of the multi-directional antenna 2, and the time required to switch the receiving direction of the multi-directional antenna 2 passes, TV broadcast signals for a certain channel are received by the tuner 11 (S4). When TV broadcast signals are received, the main controller 16 measures the receiving signal strength of received TV broadcast signals and stores the measurement results into the memory 17 (S5). Then the counter is decreased by one (S6), and it is determined whether the signal strength of digital TV broadcast signals is to be measured for all 16 receiving directions (S7). When the signal strength of digital TV broadcast signals is not measured for all 16 receiving directions (NO in S7), the receiving signal strength of the digital TV broadcast signal is measured for the next receiving direction after returning to S3.

After the measurement of the receiving signal strength for TV broadcast signals is complete for all 16 receiving directions (YES in S7), the main controller 16 reads out the measurement data stored in the memory 17, compares the strength of all receiving signals (S8), detects the best receiving direction that is the maximum receiving signal strength on a receiving channel and the best receiving signal strength in this direction, stores them (S9), and registers them to the receiving direction table (S10). Furthermore, it is determined whether the receiving strength in this best receiving direction is over a certain value (S11), and if it is over the certain value (YES in S11), the ADD flag on the receiving direction table is turned, and then the process is finished (S12). On the other hand, if the receiving strength in the best receiving direction is below the certain value (NO in S11), the ADD flag is not turned on (in other words, the ADD flag remains in the off state), and the process is finished.

Figure 5:
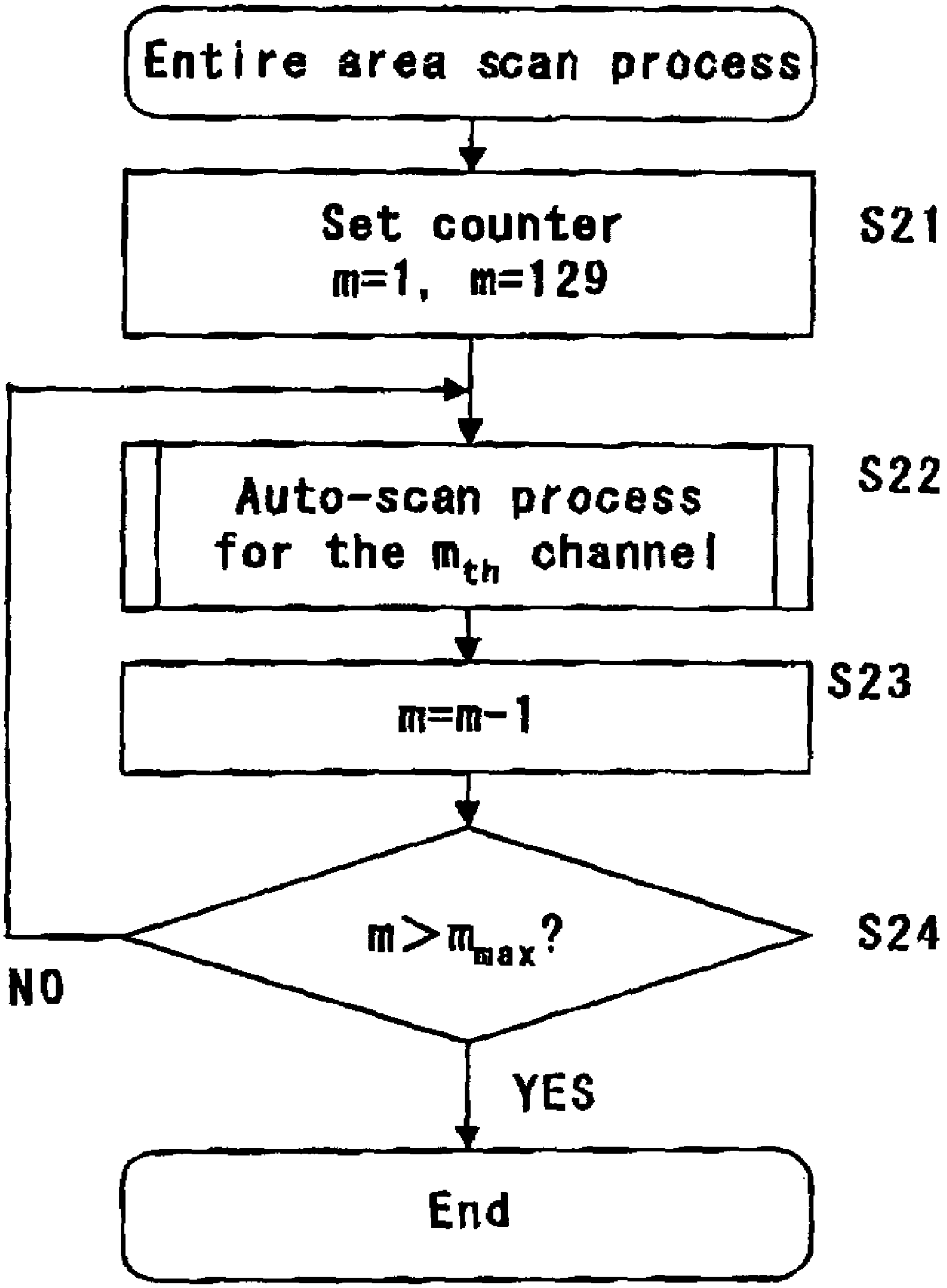
FIG. 5 is a flowchart showing the entire area scan process of the above receiver.

Next, with reference to the flowchart in FIG. 5, the entire area scan process (the auto-scan is performed for all channels), which determines the best receiving direction for all channels distributed from a broadcast station, is explained. When the entire area scan mode is selected by a user, the main controller 16 sets the counter initial value M and the number of channels MMAX in which the best receiving direction is determined according to the number of channels distributed from a broadcast station (S21). Then, by performing the above auto-scan process on the Mth channel, the best receiving direction and the ADD flag information (on, off) on this channel are determined and registered in the receiving direction table (S22). The counter is increased by one (S23), and it is determined whether the auto-scan process is to be performed for all channels (S24). When the auto-scan process is not performed for all channels (NO in S24), the auto-scan process is performed for the next channel after returning to Step S22, and once the best receiving direction and registered channel information are registered in the receiving direction table for all channels (YES in S24), the process is finished.

FIG. 6 is a figure showing an example of the receiving direction table created by the above entire area scan process. The best receiving direction 43 and an ADD flag 42 are stored in a receiving direction table 40 with a channel number 41. In addition, in FIG. 6, the ADD flag ON state is indicated by the "o" mark, and the ADD flag OFF state is indicated by no mark. Also, each number described in the column of the best receiving direction 43 corresponds to receiving directions D01 through D16 of the smart antenna 2 in FIG. 3. In this receiving direction table, channel 1 and channel 2 have the same best receiving direction D01, but, since there is no o mark for the ADD flag of channel 1, even if signals can be received, the level of the received image is low, and a sufficient quality image cannot be obtained so that it is possible to set not to receive. Therefore, when a channel is selected, it is possible to select a broadcast station only if the ADD flag exists and to omit the selection in advance if the ADD flag does not exist. Also, when the ADD flag exists, it is set such that the direction will be automatically updated if an antenna becomes unreceivable due to a forceful change in direction by the physically swinging antenna. Consequently, when the antenna direction is readjusted, it is necessary, for example, to delete information in the receiving direction table, such as the ADD flag, in order not to be affected by the previously stored direction information.

Figure 7:
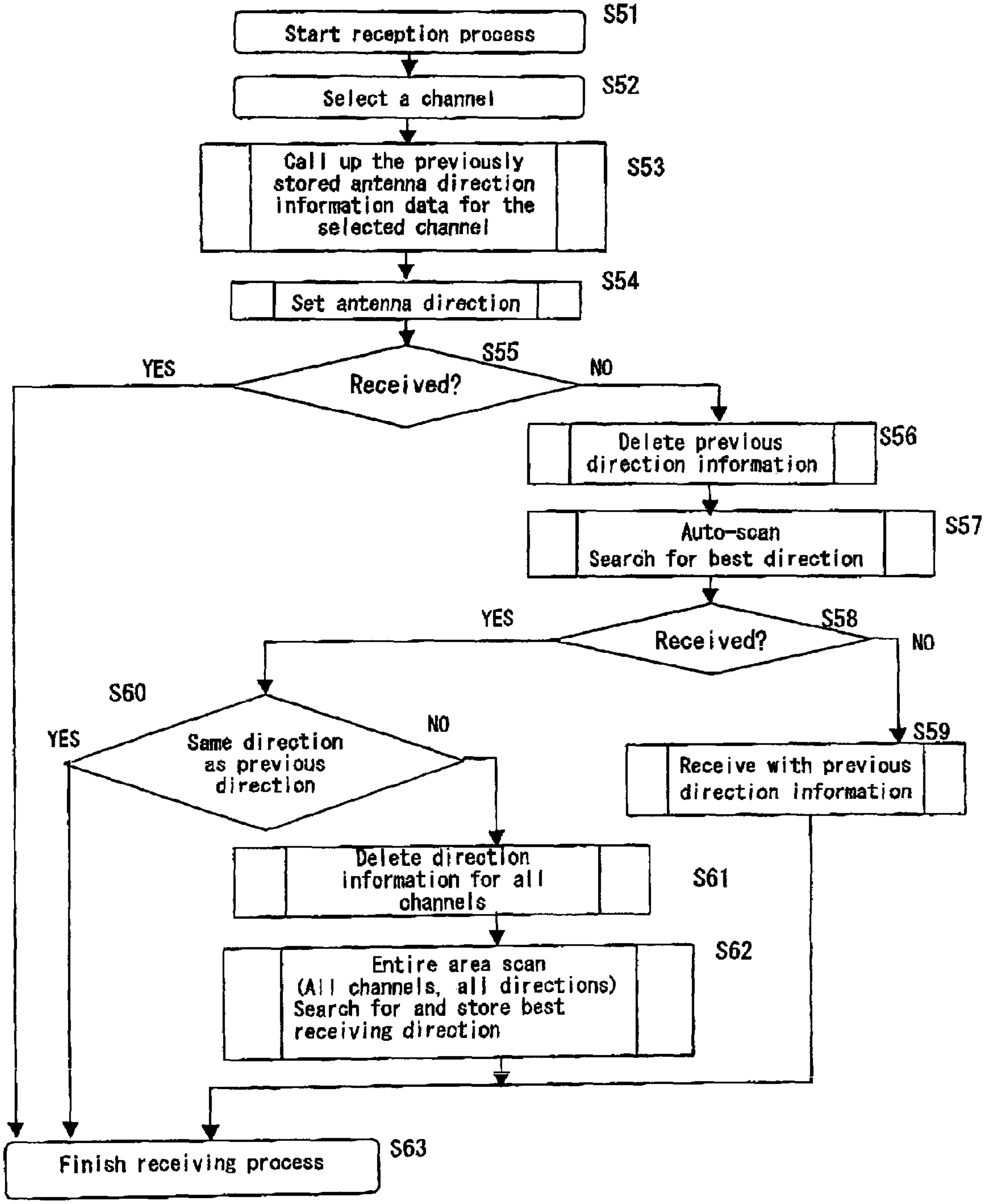
FIG. 7 is a flowchart showing the antenna readjustment process of the above receiver.

Next, for the antenna control in the case in which the antenna direction is readjusted, including the case in which a physical direction change of the antenna occurs, when TV signals are received after storing the best receiving direction and best receiving signal strength of all channels obtained in the auto-scan process in FIG. 4 and the entire area scan process in FIG. 5, an explanation is provided with reference to a flowchart in FIG. 7. In the same figure, if a receiving process starts by turning on the receiver (S51), and a desired channel (Channel P) is selected in the receiving channel selection (S52), the direction information data of selected Channel P (CH-P) is called up from already stored data (S53), and the antenna direction is set (S54). In this set receiving direction, if a desired receiving signal is obtained (YES in S55), the receiving process is finished (S63), and, if the signals could not be received in Step S55 (NO in S55), the direction information data previously stored for the receiving direction of CH-P is deleted, and, at the same time, the previous direction information data is stored in another storage area in the memory (S56). Next, when, after auto-scanning antennas and searching for the best receiving direction (S57), the best reception is obtained (YES in S58), if the receivable direction is the same direction as the previously stored one (YES in S60), the receiving process is finished (S63), or if the receiving direction is different from the previously stored direction (NO in S60), stored direction information data for all directions is all deleted (S61), the auto-scan is performed in all channels, the entire area scan searching in the all directions for the TV direction (called SEEK) is performed again, and the best receiving direction is searched and stored (S62). When the answer is "NO" in Step S58, it is set to receive with the same direction information as previous one (S59), and the process is finished (S63).

As described above, according to a digital TV broadcast receiver by the present invention, by being able to confirm the direction misalignment of the entire antenna by the direction misalignment on a channel in the early stages, the readjustment of the antenna for all channels can start quickly, and, since the scan procedure can be performed quickly and smoothly, and the receiving direction data newly obtained after scanning can be accurately stored by being able to remove the influence of stored direction data completely, the best receiving direction of antennas for all channels can be readjusted quickly and accurately, and the best reception condition can always be obtained. In addition, since updating data stored in the memory can be accurately performed on all channels, and old stored data is always deleted and updated, the amount of memory used can be reduced. Therefore, proper reception can be provided quickly without spending meaningless time and energy on the readjustment of the antenna directions.

In addition, the present invention is not limited to the above embodiment, and many variations are possible. For example, when signals cannot be received on a receiving channel, they are received on another channel, and when they can be received on neither channel, all channels are scanned for the first time. When the radio wave condition of a channel selected first is negative, and signals cannot be temporarily received, since it is thought that the radio wave condition will return soon, there is no need to scan under normal conditions. In addition, if signals can be received in the same direction as the previously stored direction data on another channel, there is no need to scan, and meaningless time for the readjustment can be saved because it is understood-that the antenna is not misaligned.

This application is based on Japanese patent application 2004-212177 filed Jul. 20, 2004, the contents of which are hereby incorporated by reference.

What is claimed is:

1. A digital television broadcast signal receiver in which a multi-directional antenna having multiple receiving directions is connected, and television broadcast signals are received enabling one receiving direction in the receiving directions, the receiver comprising:

a control signal output unit for outputting control signals to specify a receiving direction for receiving television broadcast signals to the multi-directional antenna;

a tuner, to which the multi-directional antenna is connected, and television broadcast signals are received;

a broadcast signal processing unit for performing signal processes for television broadcast signals received by the tuner;

a signal output unit for outputting signal processed by the broadcast signal process unit to a monitor;

a memory which temporarily stores signals processed by the broadcast signal process unit;

a receiving direction determination unit, which determines the best receiving direction for each receivable channel by using signals stored in the memory; and, a main controller, which controls each part of a digital television broadcast signal receiver, wherein the control signal output unit sending control signals to the multi-directional antenna and outputting control signals with a certain interval for the receiving direction of this multi-directional antenna to point in the receiving direction in turn;

wherein the broadcast signal process unit measuring the receiving signal strength of television broadcast signals for a certain channel in the order of receiving directions and storing the receiving signal strength of each measured receiving direction, the best receiving direction that is the maximum receiving signal strength for each channel, and the best receiving signal strength level obtained in this direction into each storage area in the memory as the best receiving direction information and the best receiving signal strength information;

in the case in which the receiving signal strength level in a receiving channel decreases below the best receiving signal strength level stored, and a receiving signal strength over a certain level that can display received signals cannot be obtained when the broadcast signal process unit receives a television broadcast, the receiving direction determining unit scans the multi-directional antenna and searches for the best receiving direction over all aspects in multiple directions for the receiving channel after deleting the best receiving direction information of the receiving channel stored in the memory and storing this deleted best receiving direction information from the storage area in the memory where it was stored before being deleted to another storage area, and as a result of this search, if the receiving channel cannot be received, settings for reception are set by using the previous best receiving direction information stored in the another storage area while, if the receiving channel can be received, signals are received in the same direction when the obtained best receiving direction is the same direction as the best receiving direction stored in the memory, if it is a different direction from the stored best receiving direction, the best receiving direction information and the best receiving signal strength information for all channels that are stored in the memory, are all deleted, the multi-directional antenna is scanned over all directions for all channels again, and the receiving direction of the multi-directional antenna for each channel is determined by newly storing the best receiving direction information and the best receiving signal strength information that have been newly searched by this scan into each storage area of the memory.

* * * * *